(12) United States Patent
Dunlap et al.

(10) Patent No.: US 7,166,678 B2
(45) Date of Patent: Jan. 23, 2007

(54) RUBBER COMPOSITION AND VIBRATION DAMPER USING THE RUBBER COMPOSITION

(75) Inventors: Paul N. Dunlap, Denver, CO (US); Bobbie E. South, Dryden, MI (US)

(73) Assignee: The Gates Corporation, Denver, CO (US)

( * ) Notice: Subject to any disclaimer, the term of this patent is extended or adjusted under 35 U.S.C. 154(b) by 380 days.

(21) Appl. No.: 10/815,132

(22) Filed: Mar. 31, 2004

(65) Prior Publication Data

US 2005/0221039 A1    Oct. 6, 2005

(51) Int. Cl.
- *C08F 210/10* (2006.01)
- *C08F 210/08* (2006.01)
- *C08L 23/16* (2006.01)
- *B32B 15/06* (2006.01)

(52) U.S. Cl. ............ 525/242; 525/331.7; 525/332.5; 428/344; 428/355 R; 428/416

(58) Field of Classification Search ........... 525/242, 525/331.7, 332.5; 428/344, 355 R, 416
See application file for complete search history.

(56) References Cited

U.S. PATENT DOCUMENTS

| | | | | |
|---|---|---|---|---|
| 4,362,840 A | 12/1982 | Tabar et al. | ............ | 524/525 |
| 4,419,480 A | 12/1983 | Tabar et al. | ............ | 524/525 |
| 4,671,996 A * | 6/1987 | Cantor | ............ | 428/343 |
| 4,961,254 A * | 10/1990 | Andra et al. | ............ | 29/896.92 |
| 5,310,777 A | 5/1994 | Sekido et al. | ............ | 524/496 |
| 5,610,217 A | 3/1997 | Yarnell et al. | ............ | 524/397 |
| 5,776,294 A | 7/1998 | Nagel | ............ | 156/307.7 |
| 5,844,021 A * | 12/1998 | Koblitz et al. | ............ | 523/173 |
| 6,060,552 A | 5/2000 | Kaido | ............ | 524/492 |
| 6,255,401 B1 | 7/2001 | Masaki | ............ | 525/245 |
| 6,361,643 B2 * | 3/2002 | Born et al. | ............ | 156/307.3 |
| 6,386,065 B1 | 5/2002 | Hodjat | ............ | 74/574 |
| 6,403,713 B2 | 6/2002 | Onizawa | ............ | 525/133 |
| 2002/0162627 A1 * | 11/2002 | Dunlap | ............ | 156/307.1 |

FOREIGN PATENT DOCUMENTS

EP    1 205 515 A1    5/2002

OTHER PUBLICATIONS

"Low Modulus, High Damping, High Fatigue Life Elastomer Compounds for Vibration Isolation", Marvin A. Lemieux and Paul C. Killgoar, Jr., Rubber Chemistry and Technology, vol. 57, No. 4, Sep.-Oct. 1984, pp. 792-803.

* cited by examiner

*Primary Examiner*—James J. Seidleok
*Assistant Examiner*—Olga Asinovsky
(74) *Attorney, Agent, or Firm*—P.N. Dunlap, Esq.; C.H. Castleman, Esq.; J.A. Thunau, Esq.

(57) ABSTRACT

A torsional vibration damper or other vibration damping device with a rubber vibration absorbing element. The rubber element is a peroxide-cured composition comprising 100 parts of ethylene-alpha-olefin elastomer, and 20 to 100 parts of substantially isobutylene or butene polymer having a viscosity average molecular weight greater than about 5000. The polymer may also be a copolymer of isobutylene and isoprene. The addition of the isobutylene polymer to the ethylene-alpha-olefin elastomer composition increases the vibration damping character of the rubber.

14 Claims, 2 Drawing Sheets

RUBBER COMPOSITION AND VIBRATION DAMPER USING THE RUBBER COMPOSITION

BACKGROUND OF THE INVENTION

This invention relates to an ethylene-alpha-olefin rubber composition with improved damping characteristics which can also be molded, bonded to metal, and used as the vibration absorbing element in torsional vibration dampers, engine mounts, or other such vibration control devices. This invention also relates to a crankshaft damper for absorbing torsional and bending vibrations utilizing the improved rubber composition as the vibration absorbing element. U.S. Pat. No. 6,386,065, which is incorporated herein by reference, discloses an example of a torsional vibration damper to which the subject invention could be applied. Additional examples of crankshaft dampers and examples of rubber compositions for vibration damping to which this invention could be applied are disclosed in Pub. No. US 2002/0162627, which is incorporated herein by reference.

Rubber compositions are in wide use in vibration control devices. Diene elastomers such as NR, BR, SBR, IIR, CR and NBR have traditionally been used because of their low cost. They are generally vulcanized by means of heat-activated cure systems comprising sulfur and sulfur-based cure accelerators. Rubber formulated with these elastomers is generally very limited in terms of heat resistance and ozone resistance. As performance demands have increased in many applications, such as the increase in under-hood temperatures in automotive applications, higher performance elastomers such as EPM, EPDM, HNBR, AEM, fluoro- and silicone rubbers have increased in use. EPM and EPDM, members of the ethylene-alpha-olefin family of elastomers, are desirable for vibration dampers because of their high heat resistance, ease of incorporating fillers, and relatively low cost. EPDM and EPM are also desirable because they can readily be cured with peroxide cure systems which are known to provide better compression set properties, better heat resistance, and better compatibility with certain metal-adhesive coagents than sulfur cure systems. Unfortunately for some vibration damping applications, ethylene-alpha-olefin elastomers tend to be very resilient, low-damping elastomers.

For vibration damping, the most important property of the rubber composition is the degree of damping. One way to characterize the damping of rubber is to measure the ratio of loss modulus to storage modulus, known as "tan $\delta$", by dynamic mechanical testing. Typical tan $\delta$ values for EPDM compositions are in the 0.05 to 0.1 range. What is needed in some vibration control devices is a peroxide-cured ethylene-alpha-olefin composition with improved, higher damping and tan $\delta$ values, e.g., around 0.2 or higher. An increase in damping of around 100% or more is desired.

In the article "Low Modulus, High Damping, High Fatigue Life Elastomer Compounds for Vibration Isolation," *Rubber Chemistry & Technology*, 57(4) 792–803 (1984), authors M. A. Lemieux and P. C. Killgoar, Jr. describe their attempts to increase the damping of sulfur-cured NR compositions and NR/BR blend compositions for automotive suspension applications. Known methods of increasing damping include adding more filler, decreasing the amount of curative, changing the amount of plasticizer and changing elastomers. Because of the limitations of each of these known approaches and the negative effects on the overall balance of properties of the rubber, other less predictable methods must often be tried. They focused on elastomer blends. They found that adding various grades of polyisobutylene ("PIB") having a viscosity average molecular weight of about 900,000 or more to the NR and NR/BR compositions did not increase the damping at all, but adding BIIR did have the desired effect.

U.S. Pat. No. 5,310,777 discloses a rubber composition with very high damping. In that disclosure PIB is the primary elastomer component, to which are added rather large amounts of white filler and carbon black to obtain tan $\delta$ ranging from 0.4 to 1.5. The viscosity average molecular weight of the PIB in that disclosure should be above 300,000, preferably above 1,000,000, in order to accommodate the large amount of filler required to obtain high damping. Since PIB can not be crosslinked, that disclosure suggests adding a crosslinkable secondary elastomer and appropriate curatives to the composition. However, peroxide curatives are not suggested. Elastomer blending is highly unpredictable, and no prediction was offered as to what level of tan $\delta$ will be obtained when adding a crosslinkable elastomer to PIB.

U.S. Pat. No. 6,255,401 discloses a composition with increased hysteresis loss for tire tread, wherein PIB or isobutylene-isoprene copolymer (IIR) or isobutylene-styrene copolymer (SIR), having a weight average molecular weight in the range 2000 to 50,000, is added to NR or SBR or other elastomers to increase hysteresis loss. The weight average molecular weight is believed to be very close to the viscosity average molecular weight for these materials. Only sulfur-cured compositions are suggested, and only relatively small improvements in tan $\delta$ (increases of up to 18 per cent), are demonstrated.

Another similar example is disclosed in U.S. Pat. No. 6,060,552. The examples therein show that IIR of viscosity average molecular weight around 500,000 or PIB of viscosity average molecular weight around 2,000,000 added to SBR at levels of up to 1:1 by weight only increase tan $\delta$ by as much as 20 per cent. Again, only sulfur-cured examples are provided or suggested.

It is not surprising that the art does not suggest blending PIB or IIR with a peroxide-cured elastomer such as EPDM. It is well known that PIB and IIR are severely degraded by free-radicals.

After extensive evaluation of many ingredients and blends, the present invention unexpectedly meets the need for a free-radical-cured ethylene-alpha-olefin rubber composition with increased damping for use in vibration dampers, in other vibration control devices, and in engineered rubber products subject to dynamic loading such as belts and hose. The improvement desired for vibration dampers is to approximately double the normal value of tan $\delta$.

BRIEF SUMMARY OF THE INVENTION

The present invention is directed to a free-radical-cured ethylene-alpha-olefin rubber composition with sufficiently improved damping characteristics for use in torsional vibration dampers and other vibration absorbing devices.

The invention is also directed to a vibration absorbing device comprising a free-radical-cured rubber vibration absorbing element, wherein the rubber element comprises 100 parts of an ethylene-alpha-olefin elastomer such as ethylene-propylene (EPM) or ethylene-propylene-diene rubber (EPDM), and 20 to 100 parts of substantially isobutylene or butene polymer having a viscosity average molecular weight greater than about 5000.

The invention is also directed to a rubber composition useful in a vibration absorbing or vibration control device comprising: 100 parts of ethylene-alpha-olefin elastomer; and an effective amount of substantially isobutylene or butene polymer having a viscosity average molecular weight greater than about 5000 effective for substantially increasing the vibration damping character of the composition.

The invention is also directed to a belt, hose or vibration control device comprising molded or extrusion-formed, free-radical-cured, ethylene-alpha-olefin rubber, said rubber comprising substantially isobutylene or butene polymer having molecular weight greater than about 5000 in an amount effective for substantially increasing the damping character of the rubber.

DETAILED DESCRIPTION OF THE INVENTION

Figure 1:
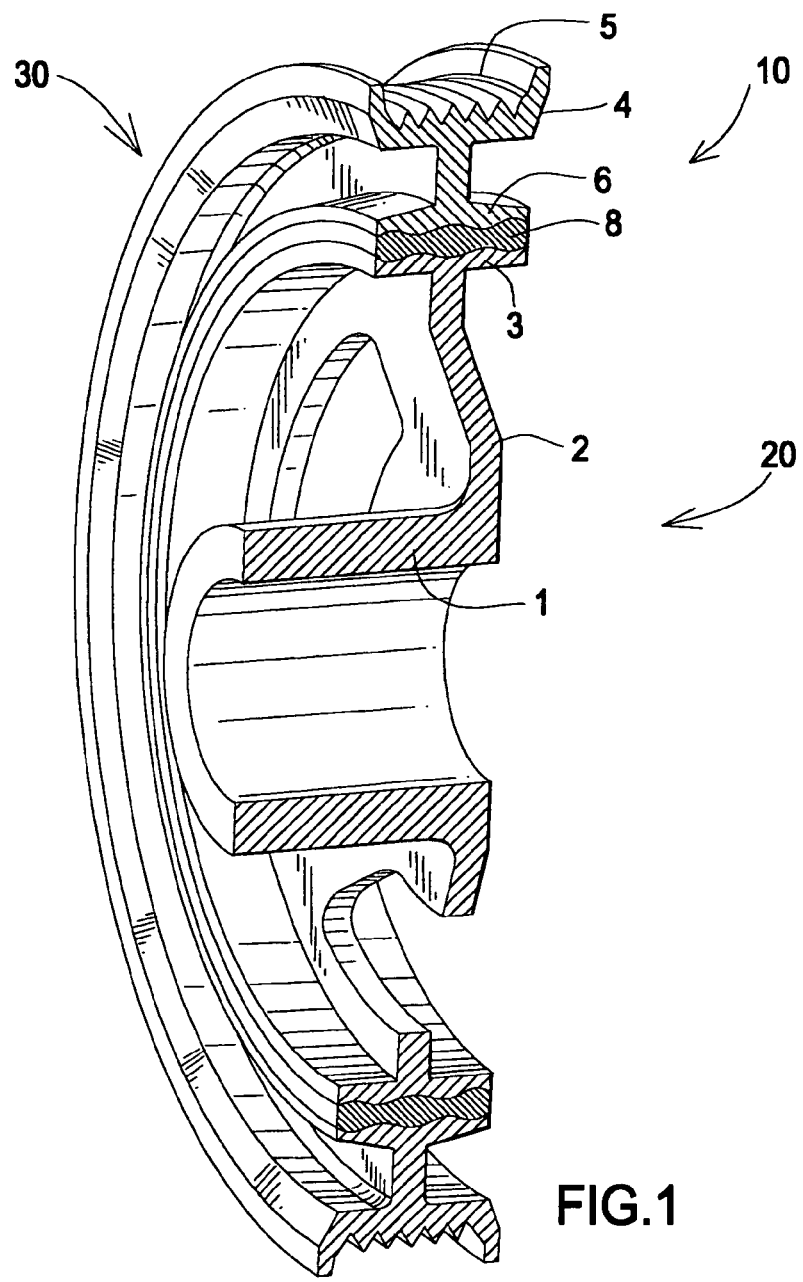
FIG. 1 is a cross section of a torsional vibration damper constructed according to the present invention.

Referring to FIG. 1, dual ring damper 10 comprises inner ring 20 and inertial outer ring 30 and sandwiched elastomeric ring 8.

Inner ring 20 comprises hub 1 and web 2 and rim 3. Hub 1 is sized to attach to a shaft (not shown, but conventional) such as a crankshaft. The configuration shown in FIG. 1 is for a press fit of hub 1 to a shaft, although a flange, or keyway, or other arrangement known in the art may also be used to secure the hub to a receiving shaft.

Inertial outer ring 30 comprises rim 6 and belt receiving portion 4. Belt receiving portion 4 may comprise any belt profile known in the art including the profile 5 for a multi-V-ribbed belt shown in FIG. 3.

Rims 3, 6 describe an annular space having a gap between them. Rims 3, 6 may be flat. Alternatively, rims 3, 6 may each have a complex shape that allows the elastomeric ring 8 to be mechanically fixed in the annular space as show in FIG. 1. Rims 3, 6 may be coated with any of the rubber-to-metal adhesives known in the art to facilitate bonding of the elastomeric ring 8 to the rim surfaces. Alternatively, the elastomeric ring 8 may reside in the annular gap under compression relying on friction forces alone to prevent slippage between the elastomeric ring 8 and the rims 3, 6. Rims 3, 6 may comprise knobs, surface roughness, or any other form of random surface irregularity or friction producing form. An adhesive adjuvant in the elastomer formulation may be used to facilitate direct bonding of the elastomer ring 8 to the rims 3, 6. Dampers can also be assembled using various friction-enhancing substances on the rim surfaces or in the assembly lubricant. Alternatively, the rubber element can be molded directly to the metal part or parts of the damper, with or without prior coating of the metal with adhesive, or assembled as disclosed in Pub. No. US 2002/0162627, the relevant parts of which are incorporated herein by reference.

Figure 2:
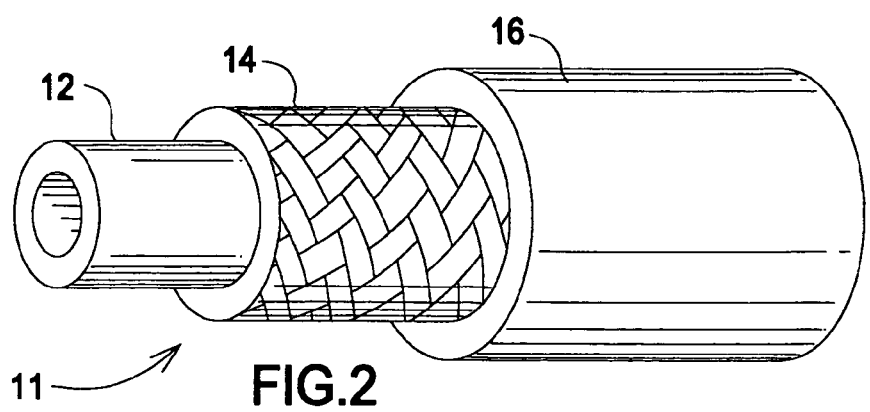
FIG. 2 is a perspective view, with parts in section, of a hose constructed in accordance with the present invention.

Referring to FIG. 2, a hose 11 constructed according to one embodiment of the present invention is shown. The hose 11 comprises an elastomeric inner tube 12, a reinforcement member 14 telescoped over and preferably adhered to the inner tube 12, and an elastomeric outer cover 16 telescoped over and preferably adhered to the reinforcement member 14. The reinforcement member 14 is formed of a suitable reinforcement material which may include organic or inorganic fibers or brass-plated steel wires. The reinforcement material is preferably an organic fiber material, such as nylon, polyester, aramid, cotton or rayon. The reinforcement construction may be of any suitable type such as braid, spiral, knit or wrapped, but in the embodiment shown, is of a braid construction.

The inner tube 12 may consist of multiple elastomeric or plastic layers which may or may not be of the same composition. The elastomeric outer cover 16 is made of suitable materials designed to withstand the exterior environment encountered. The inner tube 12 and the outer cover 16 may be made of the same material. The hose 11 may be formed by molding or extrusion. At least one elastomeric layer of either the inner tube 12 or outer cover 16 may be made more damping according to the present invention, thus improving the vibration damping character of the hose.

Figure 3:
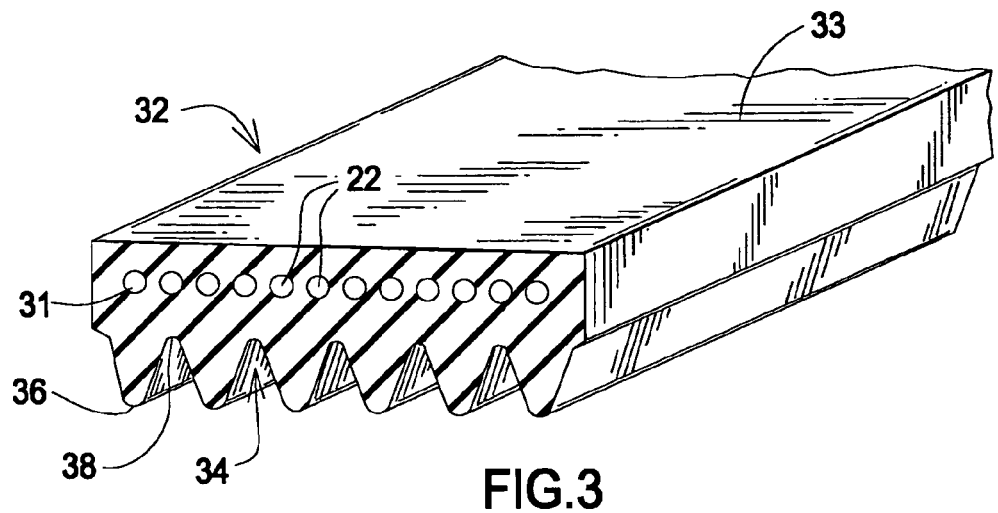
FIG. 3 is a perspective view, with parts in section, of a multi-V-ribbed belt constructed in accordance with the present invention.

Referring to FIG. 3, a multi-V-ribbed belt 32 constructed according to one embodiment of the present invention is illustrated. The belt 32 includes a main elastomeric belt body portion 33 and also includes a tensile reinforcement member 31 preferably in the form of cords 22. A plurality of raised areas or apexes 36 alternating with a plurality of trough areas 38 define there between oppositely facing sides 34 which serve as the driving surfaces of the belt 32 when in contact with the belt receiving portion 4 of the outer ring 30 described above or with any similarly mating belt pulley. The main belt body portion 33 may be formed from a rubber composition that may be improved as described in greater detail below. Other belt styles known in the art, such as synchronous belts or V-belts, may also have a main belt body portion formed from a rubber composition that may be improved according to the present invention as described below.

The description below will focus on the elastomer ring 8, but one skilled in the art will recognize that the details also apply to an elastomeric layer of hose 11 or the main belt body 33 or the rubber elements of other vibration control devices.

The elastomer ring 8 according to the present invention comprises at least one ethylene-alpha-olefin elastomer and may optionally include any of the fillers, softeners, antioxidants, coagents and curatives known in the art. Lists of ingredients and their common uses are readily available in the art. See e.g. Robert F. Ohm, ed., "The Vanderbilt Rubber Handbook," R.T. Vanderbilt Co., Inc., CT, ($13^{th}$ ed. 1990); Maurice Horton, ed., "Rubber Technology," Van Nostrand Reinhold, NY, ($3^{rd}$ ed. 1987); Th. Kempermann, S. Koch, & J. Sumner, eds. "Manual for the Rubber Industry," Bayer AG, ($2^{nd}$ ed. 1993). Suitable ethylene-alpha-olefin elastomers include copolymers of ethylene and propylene, pentene, octene, or butene. Suitable ethylene-alpha-olefin elastomers include terpolymers composed of ethylene, an alpha-olefin, and an unsaturated component such as 1,4-hexadiene, dicyclopentadiene, or ethylidenenorbornene (ENB). In one embodiment of the present invention, the primary elastomer is EPDM with ENB as the unsaturated component.

The free-radical-producing curatives useful in the present invention are those suitable for curing ethylene-alpha-olefin elastomers and include for example, organic peroxides and ionizing radiation. Exemplary organic peroxide curatives include, but are not limited to, 1,1-di-(t-butylperoxy)-3,3,5-trimethylcyclohexane, 2,5-dimethyl-2,5-di-(t-butylperoxy) 3-hexyne, dicumyl peroxide, bis-(t-butylperoxy-diisopropyl benzene), α-α-bis(t-butylperoxy) diisopropyl benzene, di-t-butyl peroxide, 2,5-dimethyl-2,5-di-t-butylperoxyhexane, and t-butyl perbenzoate. Peroxides are conventionally incorporated at about 2 to 10 parts weight per hundred of rubber (phr). Sulfur may optionally be added to the peroxide as part of the cure system at about 0.1 to 1 phr.

The elastomer composition in accordance with an embodiment of the present invention further comprises polyisobutylene (PIB), polybutene (PB) or isobutylene-isoprene rubber (IIR) having a viscosity average molecular weight (MW) above about 5000 in an effective amount to provide the desired damping level. For example, suitable PB materials include but are not limited to those sold under the trademark NAPVIS, grades 600 and 2000, by BP-Amoco Chemicals. Suitable PIB materials are exemplified by: those sold under the trademark VISTANEX, MM grades L-80, L-100, L-120 and L-140, by ExxonMobile Chemical Company; those sold under the trademark VISTANEX, LM grades MS, MH, and H, by ExxonMobile Chemical Company; those sold under the trademark OPPANOL, grades B10 through B100, by BASF Corporation; and those sold under the trademark EFROLEN, grades P10 through P100, by Alcan Rubber & Chemical, Inc. Suitable IIR elastomers are exemplified by various grades of butyl rubber such as those sold under the trademark BAYER, grades Butyl 100 and Butyl 101-3 from Bayer AG and those sold under the trademark EXXON, grades Butyl 077, 068, and 065 from ExxonMobile Chemical Company. The most preferable IIR grades are those with low unsaturation, i.e., less than about 1 mole per cent. If the unsaturation level in the IIR is greater than about 1 mole per cent, the damping is increased but not as much as desired. The MW of butyl rubber is believed to be in the range from about 300,000 to about 500,000. For simplicity, in what follows "BP" will be used to designate substantially butylene or butene polymers in general, including PIB, PB and IIR, unless the context requires more specificity.

These butene polymers (BP) used in the present invention are believed to all be substantially polyisobutylene. Butyl rubber is a copolymer of around 97 to 99 percent isobutylene and around 1 to 3 mole percent isoprene. Polybutenes are produced from mixtures of isobutylene, 1-butene and 2-butene in a process believed to result in a polymer containing about 80 percent isobutylene.

In the conventional practice of formulating rubber, an elastomeric composition may be developed that performs adequately in most respects, but is deficient in damping character. Typically such a composition will include some process oil, plasticizer or other softener. It has been found in accordance with an embodiment of the present invention that by replacing some or all of the process oil, plasticizer or other softener with BP having a MW above about 5000, the damping of the elastomer composition can be significantly increased. In a further embodiment, the molecular weight of the BP is above about 10,000. In a further embodiment, the MW of the BP is in the range of about 50,000 to about 1,250,000. It has been found that replacing about 20 to about 100 phr of process oil with BP may be sufficient to give the desired damping level. As will be seen in the examples to follow, 50 phr of BP in the MW range of about 50,000 to 1,250,000 is sufficient to approximately double the value of tan δ for an EPDM rubber composition. If less than about 20 phr of BP is incorporated in the EPDM rubber, not much increase in damping will result. Above 100 phr, the physical properties of the rubber composition become degraded. Below a MW of about 5000, the BP functions like any other process oil or softener, softening the rubber without increasing the damping. Above a MW of about 1,400,000, the BP does not have as much effect on the damping as may be desired. In the MW range of about 50,000 to about 1,250,000, the damping of EPDM can be approximately doubled by adding 50 phr of BP. Additional process oil or plasticizer may be present without adverse effect. If a greater amount of BP is needed to give the desired damping level than the amount of process oil available for substitution in the original formula, then the resulting rubber composition will probably be softer than desired. The rubber can be stiffened by increased addition of reinforcing filler such as carbon black or silica.

Other properties can be balanced or adjusted as needed by known methods of rubber formulation without departing from the disclosure of the present invention.

Other ingredients known to those skilled in the art may be used in conventional amounts for various purposes in the elastomer composition. Coagents such as triallylisocyanurate, triallylcyanurate, zinc dimethacrylate or other metal salts of alpha-beta unsaturated organic acids, N,N'-m-phenylenedimaleimide, and trimethylolpropanetrimethacrylate or other acrylates and methacrylates, may be added to enhance certain properties and/or for adhesion to metal or other materials. Carbon black or other fillers may used to reinforce or dilute the elastomer. Antioxidants, antiozonants, colorants, plasticizers, process oils, and/or process aids may be used as needed.

The torsional vibration damper of FIG. 1 is representative of vibration control devices that can be improved by incorporation of an elastomer composition based on EPDM with improved damping characteristics. Other devices comprising rubber that may be improved by increasing the damping of the rubber according to this invention include engine mounts, bushings, shaft dampers, hose, and belts. Engine mounts, bushings, and shaft dampers typically comprise metal structural members and rubber vibration absorbing elements as exemplified by the damper of FIG. 1. The hose of FIG. 2 and the belt of FIG. 3 are representative of other products comprising rubber which may be improved by increasing the damping of the rubber according to this invention. Hoses and belts typically comprise textile reinforcing members and one or more layers of rubber. Increased damping in hoses and belts may be desired either to reduce span vibration in the hose or belt, or to reduce the transmission of vibrations from one connection or contact point to another in a fluid or power transmission system.

The following examples are submitted for the purpose of illustrating the nature of the invention and are not intended as a limitation on the scope thereof.

EXAMPLES

Rubber compositions were prepared by ordinary rubber mixing methods. Rubber batches were sized to fill the internal mixing chamber of a BR Banbury® (registered trademark of Farrel Corporation) mixer to about 75 per cent of capacity. The mixer was run at 70 rpm with cooling water on. The EPDM and the BP of MW greater than 100,000 were first placed into the mixing chamber for 1 minute of blending. Then all additional ingredients except for the peroxide curatives and including the BP polymers of MW less than 100,000 were added. The ram was raised for sweeping after 3, 5 and 6.5 minutes of mixing. The mix was dumped after about 8 minutes of mixing. The mass was cooled on a two-roll mill and the peroxide curatives were then added on the mill. A sample of each composition was tested using a Rubber Process Analyzer (RPA) manufactured by Alpha Technologies. The RPA was programmed to cure the rubber composition followed by a series of tan δ measurements at several temperatures and at 7 percent strain and 100 cycles per minute frequency.

The base composition for all the examples is shown in Table 1. The 14 examples shown in Table 2 are arranged in order of increasing viscosity average molecular weight of the BP that is substituted for the process oil in Comparative Example 1. For Comparative Examples 2 through 5 and Examples 6 and 7, the supplier reported only the number average molecular weight of the BP. To facilitate comparison with the other examples, the number average molecular weight was multiplied by 2 to obtain an estimate of the viscosity average molecular weight (MW). The factor of 2 was chosen based on statements in the literature and comparisons with data from other suppliers. See e.g. "Isobutylene Polymers" in *Encyclopedia of Polymer Science and Engineering*, John Wiley, NY, Vol. 8, pp 423–448, (1987).

unsaturation in accordance with an embodiment of the present invention have a more pronounced impact on tan δ than grades with unsaturation greater than 1 mole per cent.

TABLE 1

| Compound Ingredients | Supplier | Phr |
|---|---|---|
| EPDM Keltan 7441A | DSM | 175 |
| Zinc Oxide | Many | 5 |
| Zinc Stearate | Many | 1.5 |
| Triethanolamine 99% | Many | 0.6 |
| Vulcanox HS[1] | Bayer AG | 1.5 |
| N472 Carbon Black | Columbian | 90 |
| Paraffin Oil or BP | See Table 2 | 50 |
| Saret 634[2] | Sartomer | 30 |
| HVA-2[3] | DuPont-Dow | 1 |
| Varox 231XL[4] | R. T. Vanderbilt | 1.8 |
| Varox 130XL[5] | R. T. Vanderbilt | 7.5 |

[1]2,2,4-trimethyl-1,2-dihydroquinoline, polymerized.
[2]Zinc dimethacrylate.
[3]N,N'-m-phenylenedimaleimide.
[4]2,5-dimethyl-2,5-Di-(t-butylperoxy) 3-hexyne.
[5]1,1-Di-(t-butylperoxy)-3,3,5-trimethylcyclohexane.

TABLE 2

| Example No. | Oil or BP substitute | Viscosity Average Molecular Weight | tan δ at 165° C. | tan δ at 145° C. | tan δ at 120° C. | tan δ at 100° C. |
|---|---|---|---|---|---|---|
| Comp. Ex. 1 | Paraffin Oil[1] | ~800 | 0.07 | 0.081 | 0.093 | 0.101 |
| Comp. Ex. 2 | INDOPOL ® H-15[2] | 1200 | 0.072 | 0.084 | 0.097 | 0.105 |
| Comp. Ex. 3 | INDOPOL ® H-50[2] | 1630 | 0.066 | 0.076 | 0.088 | 0.098 |
| Comp. Ex. 4 | INDOPOL ® H-300[2] | 2660 | 0.068 | 0.081 | 0.092 | 0.1 |
| Comp. Ex. 5 | INDOPOL ® H-1900[2] | 4540 | 0.063 | 0.073 | 0.09 | 0.102 |
| Ex. 6 | NAPVIS ® 600[2] | 8400 | 0.123 | 0.151 | 0.162 | 0.158 |
| Ex. 7 | NAPVIS ® 2000[2] | 11,800 | 0.165 | 0.193 | 0.194 | 0.192 |
| Ex. 8 | VISTANEX ® LM-MS[3] | 45,000 | 0.212 | 0.228 | 0.217 | 0.192 |
| Ex. 9 | VISTANEX ® LM-H-LC[3] | 63,000 | 0.222 | 0.224 | 0.199 | 0.179 |
| Ex. 10 | EXXON ® BUTYL 077[4] | ~300,000 | 0.231 | 0.211 | 0.19 | 0.181 |
| Ex. 11 | EXXON ® BUTYL 268[5] | ~500,000 | 0.162 | 0.176 | 0.174 | 0.173 |
| Ex. 12 | VISTANEX ® MM L-80[3] | 900,000 | 0.178 | 0.183 | 0.172 | 0.175 |
| Ex. 13 | VISTANEX ® MM L-100[3] | 1,250,000 | 0.17 | 0.175 | 0.169 | 0.173 |
| Ex. 14 | VISTANEX ® MM L-140[3] | 2,110,000 | 0.108 | 0.14 | 0.16 | 0.175 |

[1]Sunpar 2280 from Sun Refining.
[2]Polybutene from BP-Amoco Chemicals.
[3]Polyisobutylene from ExxonMobile Chemical Company.
[4]Isobutylene-Isoprene rubber with 0.8 mole percent unsaturation from ExxonMobile Chemical Company.
[5]Isobutylene-Isoprene rubber with 1.6 mole percent unsaturation from ExxonMobile Chemical Company.

Figure 4:
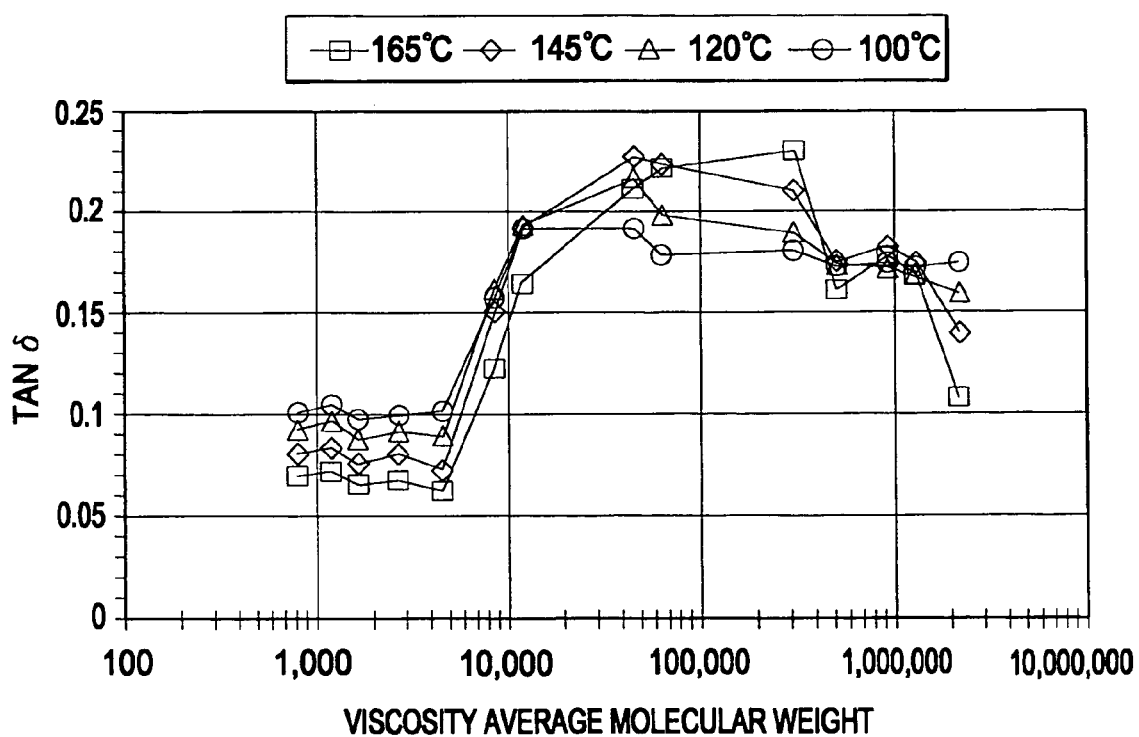
FIG. 4 is a graph of tan δ, measured at several test temperatures for EPDM rubber formulations according to the present invention, as a function of viscosity average molecular weight of the butene polymer added in the amount of 50 parts butene polymer per 100 parts EPDM.

Table 2 shows the results of the tan δ measurements for each example and for the comparative examples. The Comparative Examples 2 through 5 exhibit no increase in the tan δ value from that of Comparative Example 1. The Examples 6 and 14 show a useful increase in the tan δ value in accordance with an embodiment of the present invention. The Examples 7 through 13 illustrate how the value of tan δ can be approximately doubled from that of Comparative Example 1 by substituting BP in the molecular weight range of 10,000 to 1,250,000 in accordance with an embodiment of the present invention. FIG. 4 presents the tan δ versus MW results for these examples in graphical format.

The tan 67 increase of Example 11 is not as high as that of Example 10. This may be attributed to the higher mole per cent unsaturation in Butyl 268 compared to Butyl 077. With higher unsaturation, the Butyl 268 may participate more in the crosslinking reactions resulting in less damping. For whatever reason, butyl grades of less than 1 mole per cent Thus, the present invention provides an ethylene-alpha-olefin rubber composition with sufficiently improved damping characteristics for use in torsional vibration dampers and other vibration absorbing devices. The composition provided may be cured by free-radical-promoting cure systems. The present invention may be useful in belts or hose or other applications where increased damping is desired. The present invention also provides a torsional vibration damper with improved damping.

What is claimed is:

1. A vibration absorbing device comprising a rubber vibration absorbing element, said rubber element comprising: 100 parts of ethylene-alpha-olefin elastomer, and 20 to 100 parts of substantially isobutylene or butene polymer having a viscosity average molecular weight in the range from about 50,000 to about 1,250,000 and having less than about 1 mole per cent unsaturation.

2. The device of claim 1 wherein said device is a crankshaft torsional vibration dampener.

3. The device of claim 1 wherein said rubber element is cured by a free-radical-producing material.

4. The device of claim 3 wherein said free-radical-producing material is selected from the group consisting of organic peroxides and ionizing radiation.

5. The device of claim 4 wherein said elastomer is selected from the group consisting of ethylene-propylene copolymers, ethylene-propylene-diene terpolymers, ethylene-octene copolymers, ethylene-octene-diene terpolymers, ethylene-butene copolymers, ethylene-butene-diene terpolymers, and blends thereof.

6. The device of claim 5 wherein said polymer is polyisobutylene or polybutene.

7. A torsional vibration damper comprising a free-radical-cured rubber vibration absorbing element, wherein said rubber element comprises: 100 parts of ethylene-alpha-olefin elastomer; and 20 to 100 parts of one or more polymers having a viscosity average molecular weight in the range from about 50,000 to about 1,250,000 selected from the group consisting of polybutylene, polyisobutylene, polybutene; and polyisobutylene-co-isoprene having less than about 1 mole per cent isoprene.

8. A cured rubber composition comprising: 100 parts of ethylene-alpha-olefin elastomer; and an amount of substantially isobutylene or butene polymer having a viscosity average molecular weight above about 50,000 effective for substantially increasing the vibration damping character of the composition as indicated by an increase in tan δ of at least about 100 percent at 120° C.

9. The composition of claim 8 further comprising: a metal-adhesive adjuvant.

10. The composition of claim 8 wherein said polymer is a copolymer of isobutylene and isoprene having less than about 1 mole per cent isoprene.

11. The composition of claim 10 wherein said polymer has a viscosity average molecular weight in the range from about 50,000 to about 1,250,000.

12. The composition of claim 11 wherein said composition is peroxide cured.

13. An article selected from the group consisting of a belt, a hose and a vibration control device; comprising: molded or extrusion-formed, free-radical-cured, ethylene-alpha-olefin rubber, said rubber comprising: substantially isobutylene or butene polymer having less than about 1 mole per cent isoprene and having a viscosity average molecular weight greater than about 50,000 in an amount effective for at least doubling the damping character of the rubber as indicated by measurement of tan δ at 120° C.

14. The article of claim 13 wherein said polymer has a viscosity average molecular weight in the range from about 50,000 to about 1,250,000.

* * * * *